(12) United States Patent
Breitfuss

(10) Patent No.: US 9,537,537 B2
(45) Date of Patent: *Jan. 3, 2017

(54) COMMUNICATION PARTNER APPLIANCE WITH AUTOMATIC SEND MODE ACTIVATION

(71) Applicant: NXP B.V., Eindhoven (NL)

(72) Inventor: Klemens Breitfuss, Voitsberg (AT)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,374

(22) Filed: Jun. 17, 2016

(65) Prior Publication Data

US 2016/0301448 A1  Oct. 13, 2016

Related U.S. Application Data

(63) Continuation of application No. 14/642,661, filed on Mar. 9, 2015, now Pat. No. 9,374,137, which is a continuation of application No. 13/737,819, filed on Jan. 9, 2013, now Pat. No. 8,977,199, which is a continuation of application No. 13/553,675, filed on Jul. 19, 2012, now Pat. No. 8,374,547, which is a continuation of application No. 13/405,778, filed on
(Continued)

(30) Foreign Application Priority Data

Oct. 29, 2003  (EP) ..................................... 03104010

(51) Int. Cl.
*H04B 5/00* (2006.01)
*G06K 19/07* (2006.01)
*H04W 4/00* (2009.01)

(52) U.S. Cl.
CPC ......... *H04B 5/0031* (2013.01); *G06K 19/0707* (2013.01); *H04W 4/008* (2013.01)

(58) Field of Classification Search
USPC ....................................................... 455/41.1
See application file for complete search history.

(56) References Cited

U.S. PATENT DOCUMENTS 6,097,301 A * 8/2000 Tuttle ................... G06K 7/0008
340/10.1
6,466,771 B2 * 10/2002 Wood, Jr. ............. G06K 7/0008
455/101

(Continued)

*Primary Examiner* — Ankur Jain

(57) ABSTRACT

A communication partner appliance is implemented within a near field communication system. The communication partner appliance includes a receiver, a detector, and a processor. The receiver receives a NFC command signal from another communication partner appliance. The detector detects whether a carrier signal from the other communication partner appliance is present at the receiver at a time other than during a transmission of the NFC command signal from the other communication partner appliance to the receiver. The processor controls a power supply element based on a determination by the detector whether the carrier signal from the other communication partner appliance is present at the receiver. The power supply element is configured to establish a connection to either a first power supply or a second power supply. The first power supply is dependent on the carrier signal, and the second power supply is independent of the carrier signal.

6 Claims, 4 Drawing Sheets

Related U.S. Application Data

Feb. 27, 2012, now Pat. No. 8,249,503, which is a continuation of application No. 13/250,060, filed on Sep. 30, 2011, now Pat. No. 8,150,316, which is a continuation of application No. 10/577,516, filed as application No. PCT/IB2004/052231 on Oct. 28, 2004, now Pat. No. 8,060,010.

(56) References Cited

U.S. PATENT DOCUMENTS

| | | | | |
|---|---|---|---|---|
| 6,741,178 B1* | 5/2004 | Tuttle | ............... | G01S 13/758 |
| | | | | 156/213 |
| 2004/0246099 A1* | 12/2004 | Tuttle | ............... | G01S 13/758 |
| | | | | 340/10.1 |

* cited by examiner

COMMUNICATION PARTNER APPLIANCE WITH AUTOMATIC SEND MODE ACTIVATION

This application is a Continuation of U.S. application Ser. No. 14/642,661 filed on Mar. 9, 2015 (now allowed), which is a Continuation of U.S. application Ser. No. 13/737,819 filed on Jan. 9, 2013, entitled "Communication Partner Appliance with Automatic Send Mode Activation", now U.S. Pat. No. 8,977,199, which is a Continuation of U.S. application Ser. No. 13/553,675 filed on Jul. 19, 2012, now U.S. Pat. No. 8,374,547, entitled "Communication Partner Appliance with Automatic Send Mode Activation," which is a Continuation of U.S. application Ser. No. 13/405,778 filed on Feb. 27, 2012, now U.S. Pat. No. 8,249,503, entitled "Communication Partner Appliance with Automatic Send Mode Activation," which is a Continuation of U.S. application Ser. No. 13/250,060 filed on Sep. 30, 2011, now U.S. Pat. No. 8,150,316, entitled "Communication Partner Appliance with Automatic Send Mode Activation," which is a Continuation of U.S. application Ser. No. 10/577,516 filed on Apr. 26, 2006, now U.S. Pat. No. 8,060,010, entitled "Communication Partner Appliance with Automatic Send Mode Activation," which claims priority to PCT Application No. PCT/IB2004/052231 filed on Oct. 28, 2004, which claims priority to EP Application No. 03104010.8 filed on Oct. 29, 2003, each of which is incorporated by reference herein in its entirety.

The invention relates to a circuit, this circuit being provided for a communication partner appliance that is designed for contact less communication, this communication partner appliance being provided for a communication system with at least one further communication partner appliance, in which circuit a first communication mode or a second communication mode can be activated.

The invention furthermore relates to a communication partner appliance that is designed as a data carrier and contains a circuit as described above in the first paragraph.

The invention furthermore relates to a circuit, this circuit being provided for a communication partner appliance that is designed for contact less communication, this communication partner appliance being provided for a communication system with at least one further communication partner appliance, this circuit containing the means listed below: production means for producing a carrier signal and transmission means for transmitting the carrier signal to the further communication partner appliance.

The invention furthermore relates to a communication partner appliance that is designed as a communication station and includes a circuit as described above in the third paragraph.

The invention furthermore relates to a method of activating a first communication mode or a second communication mode of a communication partner appliance, wherein the communication partner appliance is provided for a communication system with at least one further communication partner appliance, and wherein a carrier signal is transmitted by the at least one further communication partner appliance, this carrier signal being received with the communication partner appliance.

Such a circuit of the type described in the first paragraph above, and such a communication partner appliance of the type described at the outset in the second paragraph, which has such a circuit, and such a method, are known from the patent document U.S. Pat. No. 6,466,771. In an embodiment, the known document discloses a transponder with a circuit, with the transponder and/or the circuit being designed so as to be capable of being switched over, namely between a passive communication mode and an active communication mode. It is also known from the document that the further communication partner appliance is designed as a reader station or communication station for transmitting a carrier signal.

In the case of the transponder, in the case of the active communication mode a power supply for the circuit is provided that is independent of the carrier signal, and in the case of the passive communication mode a power supply for the circuit is provided, which power supply is dependent on the carrier signal in a known manner. The known transponder or the known circuit has command signal recognition means for recognizing and processing command signals, these command signals being generated in the further communication partner appliance and being transmitted with the aid of the carrier signal. Switching over between the passive communication mode and the active communication mode takes place through a special command signal which is transmitted by the further communication partner appliance and which is designed as a change-over command signal.

A disadvantage in the case of this known transponder and method is that a desired flexibility of deployment or usability in other communication systems is subject to limits or is not possible, for example in those communication systems in which the reader station cannot generate or transmit a change-over command signal.

A further disadvantage is that a relatively large and complicated and therefore error-prone control arrangement is required, and in fact in both the transponder and in the reader station.

It is an object of the invention to eliminate the disadvantages mentioned above, and to realize an improved method and an improved circuit for a communication partner appliance designed as a data carrier, and an improved communication partner appliance designed as a data carrier, and an improved circuit for a communication partner appliance designed as a communication station, and an improved communication partner appliance designed as a communication station.

In one embodiment, a communication partner appliance is implemented within a near field communication system. The communication partner appliance includes a receiver, a detector, and a processor. The receiver receives a NFC command signal from another communication partner appliance. The detector detects whether a carrier signal from the other communication partner appliance is present at the receiver at a time other than during a transmission of the NFC command signal from the other communication partner appliance to the receiver. The processor controls a power supply element based on a determination by the detector whether the carrier signal from the other communication partner appliance is present at the receiver. The power supply element is configured to establish a connection to either a first power supply or a second power supply. The first power supply is dependent on the carrier signal, and the second power supply is independent of the carrier signal.

In another embodiment, the communication partner appliance includes a transmitter and a processor. The transmitter transmits a near-field communication (NFC) command signal to another communication partner appliance according to an active communication mode. The command signal includes a request for data from the other communication partner appliance. The processor switches from the active communication mode to a passive communication mode in response to a determination that the response signal is not received from the other communication partner appliance. Other embodiments of the communication partner appliance are also described.

In another embodiment, a method includes making a determination at a first communication partner appliance whether a carrier signal from a second communication partner appliance is present at the first communication partner appliance at a time other than during a transmission of a near-field communication (NFC) command signal from the second communication partner appliance to the first communication partner appliance. The method also includes controlling a power supply element of the first communication partner appliance based on the determination whether the carrier signal from the second communication partner appliance is present at the first communication partner appliance. The power supply element is configured to establish a connection to either a first power supply or a second power supply. The first power supply is dependent on the carrier signal. The second power supply is independent of the carrier signal. Other embodiments of the method are also described.

In other embodiments, to achieve the object stated above, in the case of a circuit for a communication partner appliance which is designed as data carrier and which is in accordance with the invention, features in accordance with the invention are provided, so that such a circuit according to the invention can be characterized in the following manner, namely:

A circuit, this circuit being provided for a communication partner appliance that is designed for contact less communication and as a data carrier, this communication partner appliance being provided for a communication system with at least one further communication partner appliance, in which circuit a first communication mode or a second communication mode can be activated, and which circuit has the means listed below:

activators for activating the first communication mode or the second communication mode, and reception means for receiving a carrier signal that is transmitted by the at least one further communication partner appliance, and detectors for detecting the presence of the received carrier signal, these detectors transmitting a carrier signal present signal in the event that the carrier signal is present, and otherwise transmitting a carrier signal not-present signal, and command signal recognition means for recognizing a command signal that can be transmitted with the aid of the carrier signal and for transmitting a command-end signal that represents the end of the transmitted command signal, and determination means for determining whether, after the occurrence of the command-end signal, at a given measurement point in time, the carrier signal present signal is present, with which determination means a first activation signal can be transmitted when the carrier signal present signal is present, and otherwise a second activation signal can be transmitted, with which first activation signal the circuit can be brought into the first communication mode with the aid of the activators, and with which second activation signal the circuit can be brought into the second communication mode with the aid of the activators.

To achieve the object stated above, furthermore in the case of a communication partner appliance according to the invention, which is designed as a data carrier, features according to the invention are provided, so that such a communication partner appliance according to the invention can be characterized in the following manner, namely:

A communication partner appliance that is designed as a data carrier and is equipped with a circuit.

To achieve the object stated above, furthermore in the case of a circuit for a communication partner appliance according to the invention that is designed as a communication station, features according to the invention are provided, so that such a circuit according to the invention can be characterized in the following manner, namely:

A circuit, this circuit being provided for a communication partner appliance that is designed for contact less communication and as a communication station, this communication partner appliance being provided for a communication system with at least one further communication partner appliance, in which further communication partner appliance a first communication mode or a second communication mode can be activated, this circuit containing the means listed below:

production means for producing a carrier signal, and transmission means for transmitting the carrier signal to the further communication partner appliance, and arranging means for arranging a communication mode, and a generator for generating at least one command signal, which command signal can be transmitted to the further communication partner appliance with the aid of the carrier signal, and first control elements for transmitting a command-end signal that represents the end of the generated command signal, and second control elements with which second control elements, after the occurrence of the command-end signal, the generation and/or transmission of the carrier signal can be ended at a particular point in time.

To achieve the object stated above, furthermore in the case of a communication partner appliance according to the invention that is designed as a communication station, features according to the invention are provided so that such a communication partner appliance according to the invention can be characterized in the following manner, namely:

A communication partner appliance that is designed as a communication station and is equipped with a circuit.

To achieve the object stated above, in the case of a method according to the invention, features according to the invention are provided, such that a method according to the invention can be characterized in the following manner, namely:

A method for activating a first communication mode or a second communication mode of a communication partner appliance, wherein the communication partner appliance is provided for a communication system with at least one further communication partner appliance, and wherein a carrier signal is transmitted by the at least one further communication partner appliance, this carrier signal being received with the communication partner appliance, and wherein in the communication partner appliance, detection of the presence of the received carrier signal takes place, and in the event of the carrier signal being present, a carrier signal present signal is transmitted, and otherwise a carrier signal not-present signal, and wherein recognition of a command signal that can be transmitted with the aid of the carrier signal takes place, and the transmission of a command-end signal that represents the end of the transmitted command signal takes place, and wherein determination is carried out to see whether, after the occurrence of the command-end signal, at a measurement point in time, the carrier signal present signal is present, wherein a first activation signal is transmitted when the carrier signal present signal is present, and otherwise a second activation signal is transmitted, and wherein with the first activation signal, activation of the communication partner appliance into the first communication mode is carried out, or with the second activation signal an activation of the communication partner appliance into the second communication mode is carried out.

Through the provision of the features according to the invention, it is achieved in an advantageous and easily realized manner that where communication partner appliances are used which, in accordance with the invention, are designed as a communication station, and which enter into communication in a communication system with communication partner appliances designed as data carriers, the communication partner appliances designed as data carriers automatically recognize in which communication mode a communication response of the communication partner appliances designed as data carriers should take place, i.e. for example whether the response should be made in an active transmission or communication mode, or in a passive transmission or communication mode. Furthermore, on account of the measures according to the invention, an advantage is achieved in particular where a communication partner appliance is designed as both a communication station and a data carrier, through which diverse deployment in various communication systems is possible. Thus for example in a so-called "Near Field Communication" (NFC) system, two communication partner appliances that are designed as both a communication station and a data carrier can communicate with one another, wherein one of the two communication partner appliances is activated as a communication station and exchanges data with the other communication partner appliance. Such communication partner appliances are mostly designed as mobile devices, and have a mobile power supply source. As a result of considerations of energy consumption in the case of such communication partner appliances, it must be noted that an optimum, energy-saving power supply is achieved when both communication partner appliances have their own power supply activated during communication. On the other hand, such communication partner appliances according to the invention can be used to advantage in, for example, an entry monitoring system, in which entry monitoring system an entry-monitoring communication station communicates with communication partner appliances which in accordance with the invention are designed as data carriers, wherein the entry-monitoring communication station has a fixed power supply, in other words to a certain extent there is an inexhaustible energy source, and wherein the data carriers can, advantageously, communicate in the passive communication mode, and thus conserve their own energy source, which energy source is limited in terms of energy output.

In the case of a communication station according to the invention, the communication mode can be arranged by an arranging action that is carried out by a user or support technician. It has been shown to be particularly advantageous if in addition, additional measures are provided. Through this, automatic switch-over of the communication mode can be carried out, depending on a power supply of the communication station.

In the case of a communication station according to the invention, it has been proven to be advantageous if in addition, additional measures are provided. This provides greater flexibility in communication with communication partner appliances. For example, in the case where an inquiry is made of a data carrier by the communication station in an active communication mode, [and] this data carrier does not or cannot emit a response signal because the relevant data carrier has no suitable power supply of its own for communicating in the active communication mode or, if there is an energy source, this power supply is no longer sufficient, and wherein as a consequence of the missing response signal, the passive communication mode is set in the communication station.

In the case of a communication station according to the invention, it has been shown to be advantageous if additional measures are provided. Through this, a favorable energy balance of the power supplies of the communication partner appliances can be achieved.

These and other aspects of the invention are apparent from and will be elucidated with reference to the embodiments described hereinafter.

The invention will be described in greater detail below, on the basis of the embodiments shown in the drawings, to which however the invention is not restricted.

Figure 1:
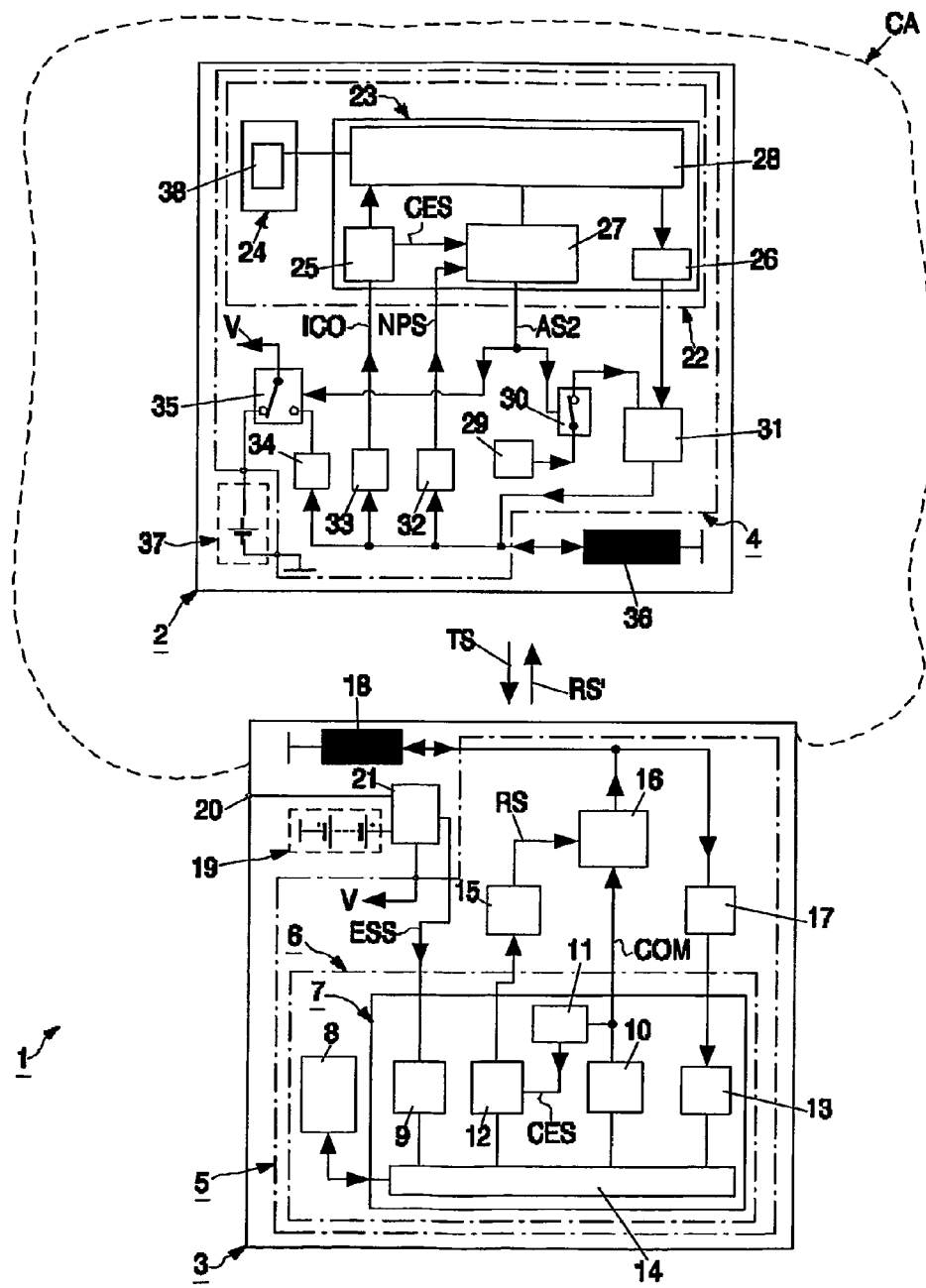
FIG. 1 shows schematically, in the form of a block diagram, those parts of communication partner appliances according to the invention that are important in the present connection, these communication partner appliances each containing a circuit according to the invention.

FIG. 1 shows a communication system 1 with communication partner appliances in a communication area CA, this communication area CA being indicated by a broken line. In the following, the communication partner appliances are referred to as devices, for brevity. Here, one device is designed as a data carrier 2 and a further device is designed as a communication station or reader station 3.

The reader station 3 is designed for contact less communication with the data carrier 2. The data carrier 2 has a circuit 4, in which circuit 4 either a first communication mode or a second communication mode can be activated, which is explained in greater detail below.

In this case, the reader station 3 is a portion of a portable small computer, in other words a PDA, and contains a station circuit 5, this station circuit 5 being designed as an integrated circuit and containing a station micro-computer 6. The station micro-computer 6 contains a central processing unit 7 and station storage media 8, this central processing unit 7 and station storage media 8 working together in a familiar manner. The station micro-computer 6 is furthermore connected to a main computer of the PDA, with the aid of interface elements, not shown, and a bus connection, and is designed to communicate with the main computer.

With the aid of the central processing unit 7, arranging means 9 for arranging a communication mode, and generators 10 for generating at least one command signal, and first control elements 11 for transmitting a command-end signal CES that represents the end of the at least one generated command signal, and second control elements 12 and reception signal processing means 13 and sequence controllers 14 are realized; these items will be dealt with in greater detail below.

The station circuit 5 furthermore has generating means 15 for generating a carrier signal RS, and modulation elements 16 and demodulation elements 17. The modulation elements 16 are connected to the generating means 15 and the generators 10, and are designed for modulating the carrier signal RS with the command signals. Also contained in the station circuit 5 are encryption elements, not shown, which encryption elements are arranged before the modulation elements 16, in order to carry out encryption of the respective command signal before modulation.

The reader station 3 has station transmission means 18, these station transmission means 18 forming both transmitters and receivers, and which define the communication area CA in the case of transmission, and which in the present case are designed with a frequency of 13.56 MHz for the transmission of a communication station signal or reader signal RS', and which are designed for receiving a data carrier signal TS from the data carrier 2. Here, the station transmission means 18 are connected to the modulation elements 16 and demodulation elements 17. Such generating means 15, modulation elements 16, demodulation elements 17, station transmission means 18 and encryption elements are well known in specialist circles, for example from the document U.S. Pat. No. 5,537,105 A1, the disclosure of which is deemed to be included here.

The reader station 3 furthermore has an accumulator 19 and an external power supply connection 20 and energy source recognition means 21, these energy source recognition means 21 being connected to the accumulator 19 and the external power supply connection 20, and being designed to emit a supply voltage V to the station circuit 5, as well as an energy source recognition signal ESS to the arranging means 9. In the present case, the energy source recognition means 21 are designed as electronic change-over switches, wherein where an external energy source or external voltage source is present at the external power supply connection 20, this external voltage source is designed to supply the station circuit 5 with energy or voltage, and an energy source recognition signal ESS that represents this external voltage source is emitted; otherwise a switch-over to the accumulator 19 takes place and the station circuit 5 is supplied with the aid of the accumulator 19, and an energy source recognition signal ESS that represents the accumulator 19 is emitted.

In the present case, the data carrier 2 is a portion of a mobile phone and contains the circuit 4, as already mentioned. The circuit 4 is designed as an integrated circuit and contains a micro-computer 22. The micro-computer 22 contains a central processing unit 23 and storage media 24, this central processing unit 23 and storage media 24 working together in a familiar manner.

With the aid of the central processing unit 23, command signal recognition means 25 for recognizing a command signal COM that can be transmitted with the aid of the reader signal RS' of the reader station 3, and command/response command generators 26, and determination means 27, and sequence controllers 28 are realized; we shall deal with the means that are mentioned above and are realized with the central processing unit 23 in greater detail below.

The circuit 4 also has an oscillator 29 for producing and emitting a carrier signal TS of the data carrier 2, and first switching elements 30 and modulation elements 31 and detectors 32 for detecting the presence of the received carrier signal RS, which carrier signal RS was transmitted by the reader station 3 as reader signal RS', and demodulation elements 33 for demodulating the received carrier signal RS, and DC voltage generating means 34, and power supply change-over elements 35.

The data carrier 2 also has transmission means 36, these transmission means 36 forming both transmitters and receivers, and which define the communication area, not shown, of the data carrier in the case of transmission, which communication area of the data carrier includes the reader station 3. Also contained in the data carrier 2 is an accumulator 37, this accumulator 37 being connected to the power supply change-over elements 35 and serving to supply energy or voltage to the circuit 4 in one communication mode, which will be dealt with in greater detail below.

The mobile phone and the PDA are designed as so-called "Near Field Communication" (NFC) devices for an NFC communication system. In this NFC communication system, the mobile phone and the PDA are designed as communication partner appliances with equality of access, and both the mobile phone and the PDA can assume the role of an initiator, wherein when the role of initiator has been assumed by one of the two communication partner appliances, the other communication partner appliance respectively assumes the role of a target. Consequently in the present case, the functionality of the data carrier 2 and of the reader station 3, described above, is included in each of the two NFC devices, wherein for each NFC device, all the components required for the function of the data carrier 2 and the reader station 3 are included or realized jointly in an integrated circuit. It can be mentioned that all these components can be contained in two separate circuits.

Each of the two NFC devices or each of the two facilities follows a communication protocol for the role that has been assumed respectively, this communication protocol being stored in the respective storage media and being executed with the aid of the respective sequence controllers. In the present case, a communication protocol that is required for the function of the target is stored in a communication protocol storage area 38 of the storage media 24 of the data carrier 2, and can be executed with the aid of the sequence controllers 28 of the data carrier 2. Furthermore, a communication protocol that is required for the function of the initiator is stored in a communication protocol storage area of the station storage media 8 of the reader station 3, and can be executed with the aid of the sequence controllers 14 of the reader station 3. Each of the two NFC devices is envisaged to be able to work in an active communication mode or in a passive communication mode, wherein for the target in the case of the active communication mode, a power supply for the circuit 4 is provided that is independent of the carrier signal RS, and in the case of the passive communication mode a power supply for the circuit 4 is provided that is dependent on the carrier signal RS. Such an active and passive communication mode is described for example in the published standard ECMA-340 of December 2002 (at http://www.ecma.ch or http://www.ecma-international.org/), whose disclosure in this regard is included herewith by reference.

An advantageous use of such an NFC device is described below on the basis of FIGS. 2 and 3.

Figure 2:
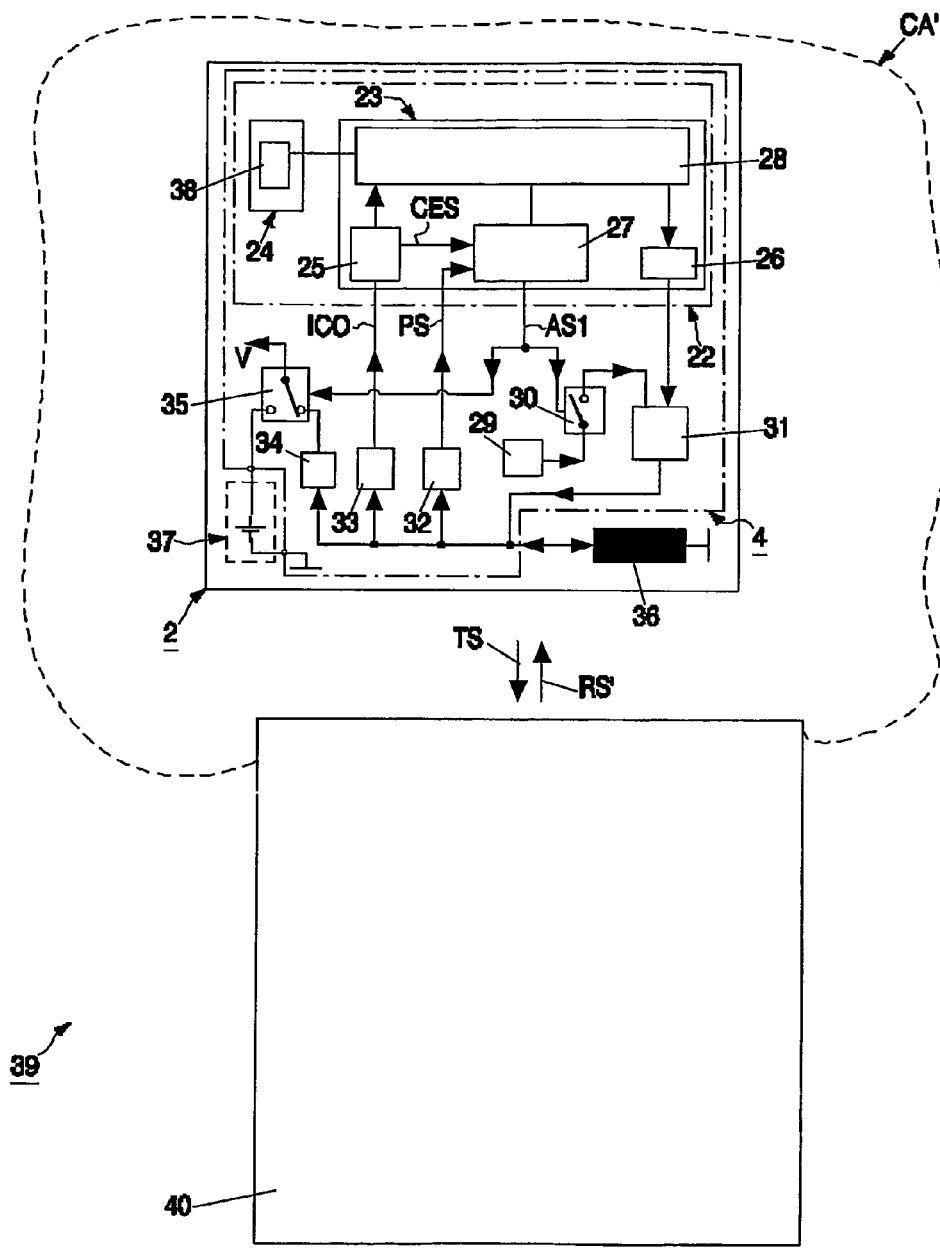
FIG. 2 shows a deployment of a communication partner appliance according to the invention in an entry-monitoring communication system.

Shown in FIG. 2 is an entry-monitoring communication system 39, wherein in the present case the data carrier 2 contained in the PDA and a reader station 40 are shown. The reader station 40 and the data carrier 2 are designed for contact less communication according to a communication protocol defined in the standard ISO/IEC 14443, type A (MIFARE). It can be mentioned that a different communication protocol can be applied here, for example according to the standard ISO/IEC 14443, type B, ISO/IEC 15693, ISO/IEC 18000. The reader station 40 contains communication elements, not shown in further detail, for communicating with the device designed as a data carrier 2, these communication elements being disclosed for example in the document US20030128124 "Communication station for inventorizing transponders by means of selectable memory areas of the transponders", this disclosure being included herewith the reference.

In the present case, the entry-monitoring communication system 39 serves to monitor entry to a subway. For this instance, the data carrier 2 has entry authorization data, these entry authorization data being provided for access to and therefore use of the subway. The reader station 40 has a fixed electrical power supply and is operated in the passive communication mode. The term "passive communication mode" as applied to the reader station 40 is chosen not because the reader station 40 is supplied from a remotely located energy source, but because in the case of the passive communication mode of the reader station 40, the at least one data carrier 2 that is in communication connection with the reader station 40 is operated in its passive communication mode. In the present case, the PDA with the data carrier 2 located in it is brought into the communication area CA' of the reader station 40 by the user of the PDA. In accordance with the passive communication mode, the reader station 40 continuously transmits a reader signal RS, this reader signal RS being received by the transmission means 36 of the data carrier 2, and being transmitted to the detectors 32 and the demodulation elements 33 and the DC voltage production means 34. The DC voltage production means 34 are connected to the supply change-over elements 35 and are designed to deliver a supply voltage V in a familiar manner. In the present case, the supply change-over elements 35 are designed such that initially, the voltage that can be delivered by the DC voltage production means 34 serves to supply the circuit 4. In the present case, in the event that the carrier signal RS reader station 40 is present, the detectors 32 transmit a carrier signal present signal PS to the determination means 27. The demodulation elements 33 are designed for demodulating the received reader signal RS and for transmitting the command signals that have been transmitted with the aid of the reader signal RS to the command signal recognition means 25. For example, in the present case an inventorizing command signal ICO is transmitted. The command signal recognition means 25 are designed to transmit a command-end signal CES that represents the end of the transmitted command signal to the determination means 27. The determination means 27 now establish whether, after the occurrence of the command-end signal CES, at a measurement point in time, the carrier signal present signal PS is present, wherein the determination means 27 transmit a first activation signal AS1 when the carrier signal present signal PS is present and otherwise, i.e. when the carrier signal present signal PS is not present, they transmit a second activation signal AS2. In the present case of the reader station 40 that is set according to the passive communication mode, after the command-end signal CES has been transmitted, the carrier signal present signal PS is present and the determination means 27 transmit the first activation signal AS1 to the switching elements 30 and the supply change-over elements 35. The supply change-over elements 35 are designed, on the basis of the first activation signal AS1, to switch over to the voltage for supplying the circuit 4 that is to be delivered by the DC voltage production means 34. The circuit 4 is thus switched into the passive communication mode, wherein an electrical power supply applies that depends on the reader signal RS, and advantageously the device's own limited power supply provided by the accumulator 37 is conserved.

Figure 3:
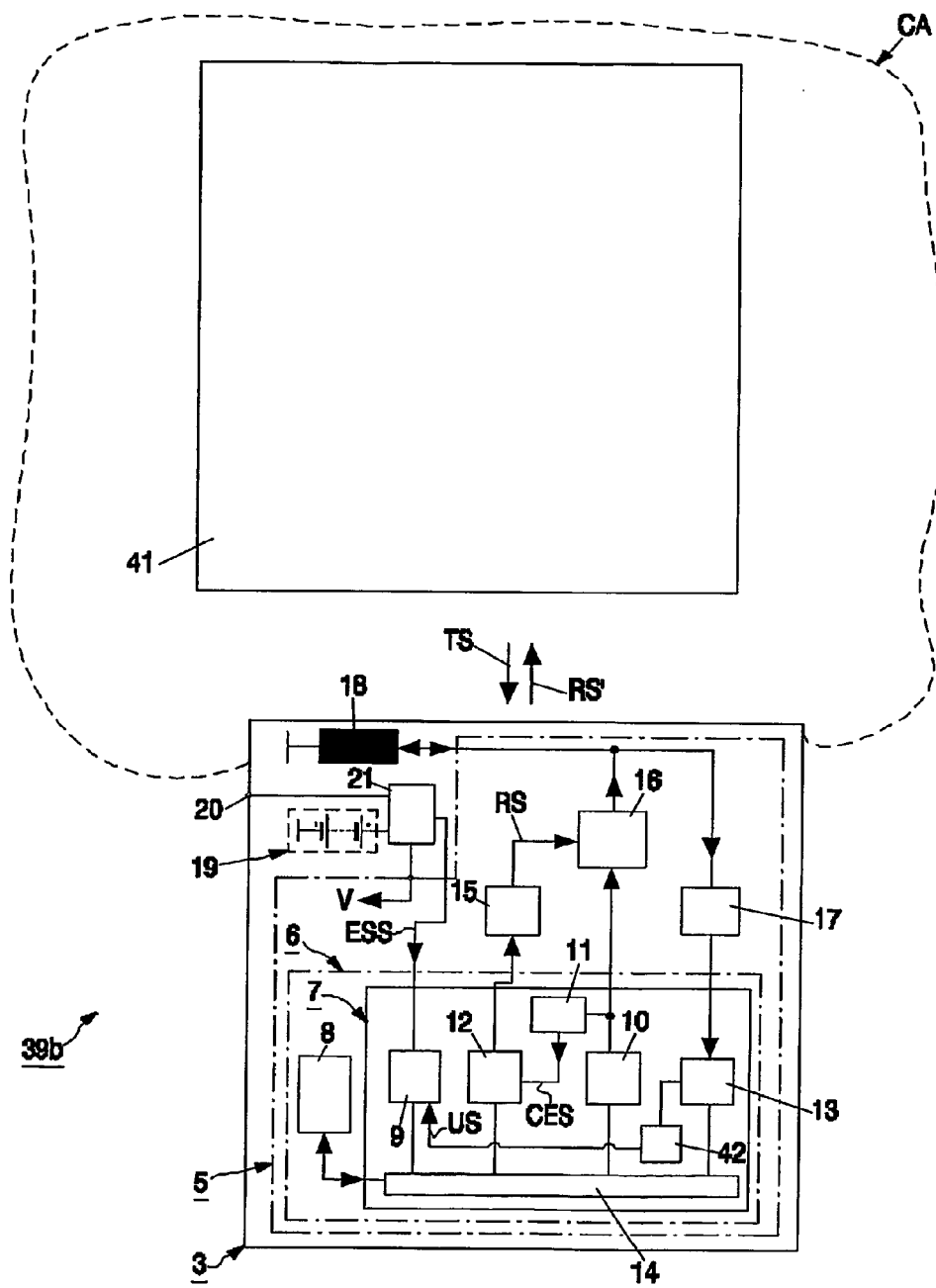
FIG. 3 shows a deployment of a communication partner appliance according to the invention in a further communication system.

A further advantageous use of such an NFC device is now described on the basis of FIG. 3, in which FIG. 3 a communication system 39*b* is shown. In the present case it is assumed that the user of the PDA in the subway becomes aware of an advertising poster for an event, further referred to as poster for short. The poster has a tag 41 as shown in FIG. 3, this tag 41 containing event information about an event advertised on the poster and being designed for communicating in a passive communication mode. Such tags are well known in specialist circles, which is why they will not be elucidated further here. Also shown in FIG. 3 is that portion of the PDA which, according to FIG. 1, is designated as a reader station 3. In the present case, the reader station 3 is used for reading out the event information from the tag 41. Via the PDA's input means, not shown in further detail here, such as a keyboard in the present case, the reader station 3 is activated as an initiator, wherein on account of the circumstances the accumulator 19 is activated to provide the power supply for the circuit 5. The PDA or the reader station 3 is now brought into the vicinity of the poster, so that the tag 41 comes into the communication area CA of the reader station 3. The reader station 3 according to FIG. 3 also has response signal detectors 42, these response signal detectors 42 being realized with the aid of the central processing unit 7. The response signal detectors 42 are connected to the reception signal processing means 13, and are provided for the detection of a response signal TS that is transmitted by the further communication partner appliance; when one is detected by the response signal detectors 42, a switch-over signal US can be generated, which switch-over signal US can be transmitted to the fixing means 9. Here, the fixing means 9 are designed automatically to set the communication mode depending on the switch-over signal US that has been generated.

If, as in the present case, the reader station 3 starts according to a protocol for the active communication mode, the tag 41 will not emit a response signal TS and consequently no response signal TS will be received in the reader station 3 and processed. Subsequently, with the aid of the response signal detectors 42, the switch-over signal US is generated and transmitted to the arranging means 9, whereupon the reader station 3 switches into the passive communication mode that is appropriate for communicating with the tag 41. The event information can now be read out in the customary manner from the tag 41, and then stored in the station storage media 8 for further use.

Such further use is now described on the basis of FIG. 1. In the present case it is assumed that the user of the PDA wishes to draw a friend's attention to the aforementioned event and wishes to convey the event information to that friend. This is to take place by means of the aforementioned mobile phone. For this, the event information stored in the PDA or station storage media 8 of the reader station 3 is transmitted to the mobile phone. The PDA or the reader station 3 can, as mentioned above, be activated by means of input means and assumes the role of initiator. The mobile phone with the data carrier 2 contained therein is brought into the communication area CA. As already mentioned in connection with FIG. 2, in the data carrier 2 the supply change-over elements 35 are designed such that initially, the voltage that can be delivered by the DC voltage production means 34 serves to supply the circuit 4. On account of the power supply by the accumulator 37, the reader station 3 is first of all operated in the active communication mode. The subsequent communication sequence is now described on the basis of FIG. 4.

Figure 4:
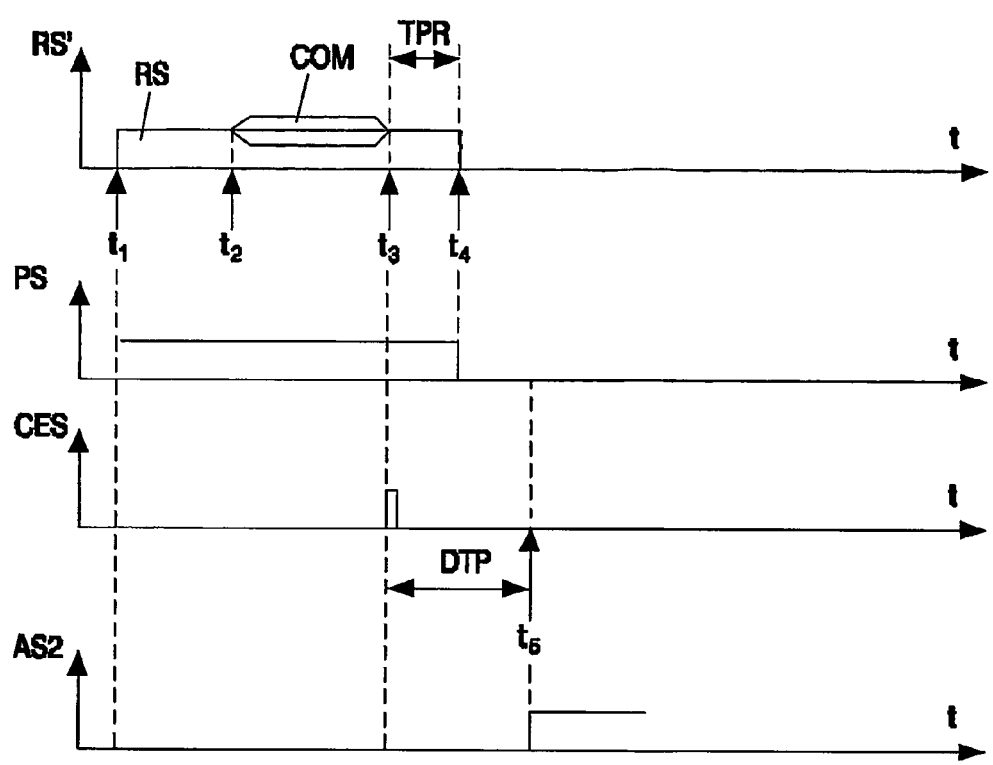
FIG. 4 shows, schematically, commands and signals that are transmitted between the communication partner appliances.

As is shown in FIG. 4, from a first point in time t1 onwards, the carrier signal RS is generated and is then transmitted as a reader signal RS'. From a second time point t2 to a third time point t3, in the generators 10 of the reader station 3 a command signal COM is generated and is emitted as a modulated signal with the carrier signal RS. The first control elements 11 transmit a command-end signal CES of the reader station 3 that represents the end of the generated command signal COM to the second control elements 12, whereupon the second control elements 12 initiate the situation that after a time period TPR after the occurrence of each command-end signal, the carrier signal RS is switched off by the command-end signal CES of the reader station 3 in the production means 15, or is no longer generated, and consequently no reader signal RS' is transmitted to the data carrier 2. The time period TPR corresponds in the present case to a period duration of 30 oscillations of the carrier signal or reader signal RS. It can be mentioned that the time period TPR can be greater, for example 60 or 90 oscillations of the carrier signal, or smaller, for example just 10 or 20 oscillations of the carrier signal. What is important here is that the detectors 32 have sufficient time to be able safely and reliably to recognize whether the carrier signal RS' is present or no longer present or switched off.

The switching off of the carrier signal RS takes place at a fourth point in time t4 in accordance with FIG. 4. It can be mentioned that interrupt elements for interrupting the transmission of the reader signal RS' can be arranged between the modulation elements 16 and the transmission means 18, and these interrupt elements can then be activated by the second control elements 12 for interruption.

As has already been mentioned, the detectors 32 of the data carrier 2 are designed to detect the presence of the received carrier signal RS. The detectors 32 are furthermore designed to emit or transmit a carrier signal present signal PS in the event that the carrier signal RS is present, and otherwise to emit or transmit a carrier signal not-present signal NPS. In the present case, in FIG. 4 the time dependent behavior of the carrier signal present signal PS is shown, wherein such a carrier signal present signal PS is no longer transmitted from the fourth time point t4 onwards. Furthermore, the command signal recognition means 25 of the data carrier 2 are designed to recognize a command signal that can be transmitted with the aid of the carrier signal RS, and to emit a command-end signal CES that represents the end of the transmitted command signal. Shown in FIG. 4 is the time progression for the command-end signal CES of the data carrier 2 for the present case, wherein from the third time point t3 onwards, i.e. after the end of the command signal COM transmitted by the reader station 3, the command-end signal CES is shown as a short pulse. In the determination means 27, triggered by the command-end signal CES, after a time period DTP it is established whether, after the occurrence of the command-end signal CES, at a measurement point in time, as in this case after the expired time period DTP at a fifth point in time t5, the carrier signal present signal PS is present. In the present case the time period DTP lasts for 60 oscillations or periods of the carrier signal RS. It can be mentioned that the time period DRP can be of a different duration, for example three or four times the duration of the time period TPR. According to the present circumstances, the determination means 27 transmit the second activation signal AS2, since at the fifth point in time t5 no carrier signal present signal PS is present. Subsequently, with the aid of the second activation signal AS2 the circuit 4 is brought into the second communication mode with the aid of the activators, i.e. in the present case into the active communication mode, wherein for this the supply change-over elements 35 are controlled such that the power supply for the circuit 4 is provided by the accumulator 37, and wherein the first switching elements 30 are controlled such that a carrier signal for generating the data carrier signal TS can be transmitted by the oscillator 29 in a familiar manner to the modulation elements 31 of the data carrier 2.

It can be mentioned that instead of the aforementioned PDA, the aforementioned mobile phone can be used to read out such a tag 41, wherein the event information can then be transmitted to the PDA, and in the course of this the mobile phone can take on the role of the reader station 3.

It should furthermore be mentioned that instead of the mobile phone or PDA, other devices can be designed as NFC devices, for example a laptop, a watch, a digital camera, a camcorder and much else besides. Thus for example it can be the case that with such a watch designed as an NFC, the type of event information mentioned above can be polled and subsequently this event information can be conveyed to the laptop, for example for the purpose of managing appointments. The laptop can optionally be connected to a power supply mains network or operated independently of the mains supply, with an accumulator. Depending on the electricity or power supply situation of the laptop, corresponding communication can be initiated in the passive communication mode or active communication mode, as has been explained above.

It should furthermore be mentioned that the reader signal RS' and the data carrier signal TS can lie in another frequency range, for example at a frequency of 125 kHz.

It should furthermore be mentioned that influencing means for influencing a signal strength of the carrier signal RS depending on the set communication mode can be provided in the reader station 3 and/or in the data carrier 2. Thus the influencing means can for example be designed such that in the active communication mode, the reader signal RS' is transmitted with a low field strength, through which the device's own power supply that is used in the case of the active communication mode can be conserved.

What is claimed is:

1. A communication partner appliance comprising:
    a transmitter configured to transmit a near-field communication (NFC) command signal to another communication partner appliance according to an active communication mode, wherein the NFC command signal includes a request for data from the other communication partner appliance; and
    a processor coupled to a generator and the transmitter, wherein the processor is configured to switch from the active communication mode that uses a first power supply to a passive communication mode that uses a second power supply in response to a determination that a response signal is not received from the other communication partner appliance.

2. The communication partner appliance of claim 1, wherein the first power supply is independent of a carrier signal.

3. The communication partner appliance of claim 1, wherein the second power supply is dependent on a carrier signal.

4. The communication partner appliance of claim 1, further comprising:
    a power supply change-over element configured to switch between the first power supply and the second power supply.

5. The communication partner appliance of claim 4, further comprising:
    an accumulator coupled to the power supply change-over element in the active communication mode.

6. The communication partner appliance of claim 4, further comprising:
 a DC voltage generator coupled to the power supply change-over element in the passive communication mode.

\* \* \* \* \*